(12) United States Patent
Whiton (10) Patent No.: US 9,622,550 B2
(45) Date of Patent: Apr. 18, 2017

(54) METHODS AND APPARATUS FOR ROBOTIC ZIPPER

(71) Applicant: Adam Whiton, Boston, MA (US)

(72) Inventor: Adam Whiton, Boston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 207 days.

(21) Appl. No.: 14/492,462

(22) Filed: Sep. 22, 2014

(65) Prior Publication Data

US 2015/0082582 A1     Mar. 26, 2015

Related U.S. Application Data

(60) Provisional application No. 61/880,926, filed on Sep. 22, 2013.

(51) Int. Cl.
| | |
|---|---|
| *A44B 19/00* | (2006.01) |
| *A44B 19/24* | (2006.01) |
| *A44B 19/28* | (2006.01) |
| *A44B 19/26* | (2006.01) |

(52) U.S. Cl.
CPC ............ *A44B 19/285* (2013.01); *A44B 19/26* (2013.01); *Y10S 901/46* (2013.01); *Y10T 24/2566* (2015.01)

(58) Field of Classification Search
CPC ..... Y10S 901/46; A44B 19/303; A44B 19/26; A44B 19/262; A44B 19/28; A44B 19/04; A44B 19/06; Y10T 24/2543
See application file for complete search history.

(56) References Cited

U.S. PATENT DOCUMENTS

| 674,213 A | 5/1902 | Oldfield |
|---|---|---|
| 1,219,881 A | 3/1917 | Sundback |
| 1,980,955 A * | 11/1934 | Norton ................... A44B 19/26 24/381 |
| 6,596,955 B2 | 7/2003 | Eves et al. |
| 7,304,600 B2 | 12/2007 | Nehls et al. |
| 7,320,158 B2 | 1/2008 | Deto et al. |

* cited by examiner

*Primary Examiner* — Jack W Lavinder
(74) *Attorney, Agent, or Firm* — Thomas P. O'Connell; O'Connell Law Firm (57) ABSTRACT

A robotic zipper system for joining and separating zipper halves of a zipper tape. A chassis retains an actuator that drives a zipper slide geometry along the zipper tape to join or separate the zipper tape. A sensor can determine zipper slide position, and a control module can provide an electrical signal to the motor to move in forward or reverse. The actuator can have a motor that drives a gear system that mechanically engages zipper teeth. Teeth of the gear system can be out of phase to mesh with alternating gaps between the zipper teeth. The actuator can be removable relative to a zipper slide. Zipper slide geometry could be integrated into the chassis, such as in the form of a channel, potentially with a central post. A sensor could be positioned to detect the presence or absence of zipper teeth through an opening in a base plate.

22 Claims, 5 Drawing Sheets

METHODS AND APPARATUS FOR ROBOTIC ZIPPER

RELATED APPLICATION

This application claims priority to U.S. Provisional Patent Application No. 61/880,926, filed Sep. 22, 2013, which is incorporated herein by reference.

FIELD OF THE INVENTION

The present invention relates generally to a robotic zipper for fabric joining, which may alternatively be referred to as an electric-mechanical machine guided by electronic circuitry and computer programming. Stated more particularly, disclosed herein is a continuous closure for fabric edge joining and augmented with robotic attributes including sensing, actuation and computation to create a programmable zipper closure.

BACKGROUND OF THE INVENTION

Gideon Sundback, an early designer of the modern zipper obtained a U.S. Pat. No. 1,219,881 for the 'Separable Fastener'. In 1923 the name was rebranded as the "zipper" by the B.F. Goodrich Company which integrated the zipper into rubber boots and tobacco bags. In the 1930s the zipper was popularized in the fashion industry for closures in garments, handbags and other textile items. Now there are many different zipper types including zippers that use molded plastic teeth, metal teeth, plastic coil teeth and zippers that are sealed to be waterproofed among others. Zippers for clothing continue to improve beyond the prior art and more recently also offer a means to electrically connect to electronics and digital devices.

U.S. Pat. No. 4,603,327 issued to Leonard et al describes a zip fastener for a garment that positions a pair of electrical conductors on a zipper in order to cause a zip opening to signal an electronic circuit and emit a warning signal.

U.S. Pat. No. 6,596,955 issued to Eves et al. describes a zipper fastener comprising conductive thread or conductive ink to establish an electrical connection between adjoining teeth. The moving zipper fastener increases or decreases the electrical resistance along the path so that the zip fastener behaves as a potentiometer that can then be used to modify the volume of a built in audio system in a garment.

U.S. Pat. No. 7,304,600 issued to Nehls et al. describes a zipper operated remote controller for garments that can be used to transmit command signals to a Bluetooth™ enabled device such as a cell phone or television.

U.S. Pat. No. 7,320,158 issued to Deto et al. describes a magnetic fastener comprising a pair of fastener tapes and two rows of magnetic elements, so that the magnetic elements are joined together via magnetism. The fastener can be used as a closure for the front of a garment.

One can appreciate that in an electronic and digital age that the prior art seek to electrically connect a garment with an electronic device however they fail to improve on the basic rudimentary function of the zipper for the persons using them. Zippers can be notoriously difficult to manipulate for persons with a limited dexterity in the fingers or a handicap. Zippers are much easier to zip with a two handed motion and when there is not too much force needed for the action of zipping or unzipping. Also, the placement of the zippers on the body can also affect the degree of ease in their manipulation. For example, zippers placed at the back of a dress or the back of a boot can be difficult to use and can require assistance from other persons. Similarly, some extreme applications where gas tight zippers are used such as in chemical and biological hazmat suit zippers can be extremely difficult to operate with the force required to open and close them. Additionally, zippers used in large structures such as tents and long cables can be burdensome to reach and arduous to control. In light of the foregoing, it will be appreciated that there is a need for a zipper to be automated and controlled more easily for persons of limited dexterity and in clothing such as the back of a dress, chemical and biological hazmat suits and large structures such as tents. An automated zipper including sensing and computation would add significant improvements over the prior art.

SUMMARY OF THE INVENTION

The present invention is thus founded on the basic principle of incorporating a methods and apparatus for robotic zipper is for providing actuation to fabric joining for persons with limited dexterity and limited abilities as well as in applications where any number of clothing systems incorporating actuated fabric joining would be useful as in the case of donning and doffing full body chemical and biological suits, space suits or zippers in hard to reach areas such as the back of the body or hard to reach areas in large tent structures. The present invention comprises a chassis and an actuator that drives a zipper slide along a zipper tape and thus joining or separating the zipper as it moves.

A related object of the invention is to provide the actuated zipper slider the means to determine the location and position of the zipper slider on the zipper tape and a means for a processor to electrically signal the motor to move in a forward or reverse direction. The actuated zipper would enable persons of limited dexterity and limited abilities to have a means to control the position of the actuated zipper on the body and would also be useful and comfortable in everyday life in the assistance of donning and doffing clothing.

Another object of the embodiment of the invention is to provide an actuated zipper slider with a motor and gear box that is also mechanically coupled with the zipper teeth. In one preferred embodiment the zipper slider can be attached to a traditional off-the-shelf market bought zipper. However, in yet another embodiment the zipper teeth can be mechanically enhanced to couple exactly with the gears of the actuated zipper and thereby increase the reliability of the coupling to the zipper teeth in order to prevent the slider from running off the zipper track. Additionally, the reliable coupling of the zipper teeth also increases the efficiency of the motor in providing the appropriate amount of torque forces that the actuated zipper can manage.

A related object of embodiments of the invention is wherein the mechanical coupling with the zipper teeth is coupled with a gear system that has two sets of teeth that are out of phase with each other and mesh with the alternating gaps between the zipper teeth.

A further object of the invention, in particular embodiments, wherein a zipper slider geometry is designed to merge fabric edges with zipper teeth together and is integrated into the chassis.

Yet another object of embodiments of the invention is wherein the bottom plate of the chassis provides a means to physically support the mechanical coupling of the gear and zipper teeth and additionally has a channel in which to guide the merged zipper teeth in or out of the zipper head geometry for merging or separating.

A still further object of the embodiments of the invention is wherein the motor and gearbox selectively allow a back-drivable transmission or manual operation.

Yet another object of the embodiment of the invention is wherein the zipper head includes a circuit for electrical/wireless communication with other devices and the internet.

Further embodiments of the invention can assist in the usefulness of the invention for everyday use by incorporating a power source for the motor, visual light indicators on the chassis for visibility and wearer feedback as well as indicators that are sensitive to sound and the sense of touch or gesture.

These and further objects and advantages of the present invention will become obvious not only to one who reviews the present specification and drawings but also to those who have an opportunity to experience an embodiment of a methods and apparatus for robotic zipper as disclosed herein. However, it will be appreciated that, although the accomplishment of each of the foregoing objects in a single embodiment of the invention may be possible and indeed preferred, not all embodiments will seek or need to accomplish each and every potential advantage and function. Nonetheless, all such embodiments should be considered within the scope of the present invention.

In carrying forth the objects of the invention, embodiments of the robotic zipper system can provide, among other things, actuation to join materials for persons with limited dexterity and limited abilities. By way of further example and not limitation, embodiments of the robotic zipper system also have application where any number of clothing systems incorporating actuated fabric joining would be useful, such as in the case of donning and doffing chemical and biological suits, space suits, or zippers in hard to reach areas as with the back of the body or hard to reach areas in large tent structures.

One embodiment of the robotic zipper system can join and separate zipper halves of a zipper tape with a zipper slide geometry and can be founded on a chassis. An actuator can be retained by the chassis. The actuator can drive the zipper slide geometry along the zipper tape thereby to join or separate the zipper tape, such as depending on the direction of travel of the zipper slide geometry.

In certain practices of the invention, a sensor can be provided for determining a position of the zipper slide geometry along the zipper tape. While other sensors will be obvious to one skilled in the art after reading this disclosure and are within the scope of the invention except as it might be expressly limited by the claims, one such sensor can achieve position detection by detecting the presence or absence of zipper teeth.

The actuator could, for example, include a motor and a gear system. A control module could provide an electrical signal to the motor to move in a forward direction to join the zipper halves of the zipper tape or a reverse direction to separate the zipper halves of the zipper tape. Moreover, electronic circuitry could be operative as a communication module for exchanging data.

The robotic zipper system can operate in relation to multiple types of zipper tapes, including zipper tapes with zipper teeth. Again, the actuator could have a motor and a gear system with the motor being operative to drive the gear system and the gear system mechanically engaging the zipper teeth. Embodiments of the robotic zipper system are contemplated wherein the gear system that has two sets of teeth that are out of phase with each other and that mesh with alternating gaps between the zipper teeth. For example, the gear system could mechanically engages the zipper teeth via friction with a wheel/roller that uses surface friction to engage the zipper tape.

Manifestations of the robotic zipper system are possible wherein the zipper slider geometry is retained by the zipper tape, such as with a traditional zipper. Also within the scope of the invention, the zipper slider geometry could be integrated into the chassis. For example, where the zipper halves have zipper teeth, the chassis can have a bottom plate with a channel forming the zipper slider geometry. In such embodiments, the channel can guide the zipper teeth into and out of the zipper slider geometry for joining or separating the zipper tape. The zipper slider geometry could have a central post, which could have a hollow conduit. The bottom plate can further provide physical support for mechanical engagement of the gear system and the zipper teeth. It is further contemplated that the motor and gear system can selectively switch a back-drivable transmission for manual operation.

Where the chassis has a base plate, an opening can be incorporated into the base plate to provide an unobstructed view of the presence or absence of zipper teeth. With that, a sensor can be positioned to detect the presence or absence of zipper teeth through the opening in the base plate.

Robotic zipper systems are disclosed wherein the actuator comprises a motor and an electronic circuit for motor control module retained by the chassis. The electronic circuit can have a communication module for sending and receiving electronic signals and data. It is further disclosed that the actuator can comprise a motor and a power source in the form of a battery for supplying electric power to the motor.

Even further, it is contemplated that visual indicators could be located on the chassis. The robotic zipper system could, in particular embodiments, include a sonic indicator and, additionally or alternatively, a touch sensor.

The actuator could be removable from the zipper tape. For example, the actuator could be removable from the zipper slider.

One will appreciate that the foregoing discussion broadly outlines the more important goals and features of the invention to enable a better understanding of the detailed description that follows and to instill a better appreciation of the inventor's contribution to the art. Before any particular embodiment or aspect thereof is explained in detail, it must be made clear that the following details of construction and illustrations of inventive concepts are mere examples of the many possible manifestations of the invention.

DETAILED DESCRIPTION OF THE PREFERRED EMBODIMENTS

As is the case with many inventions, the present invention for a robotic zipper is subject to a wide variety of embodiments. However, to ensure that one skilled in the art will fully understand and, in appropriate cases, be able to practice the present invention, certain preferred embodiments of the broader invention revealed herein are described below and shown in the accompanying drawings.

Pursuant to the invention, a robotic zipper system can be embodied in relation to a zipper or a continuous closure for joining edges, such as but not limited to edges of fabric, that can be augmented with robotic attributes, such as sensing, actuation and computation, to create a programmable robotic zipper closure. With this in mind and looking more particularly to the accompanying figures, a first preferred embodiment of the present invention for a robotic zipper system is indicated generally at 10 in FIG. 1 and in an exploded view in FIG. 3. There, one sees that the robot zipper 10 can have a chassis 12 further divided into a chassis top half 12A and a chassis bottom half 12B, which contains a zipper slider 14, and motor 16 which is in mechanical coupling with a gear box 18. The gear box 18 is in mechanical coupling with a split gear 20 and thus can turn it in either a clockwise or counterclockwise direction.

Figure 2:
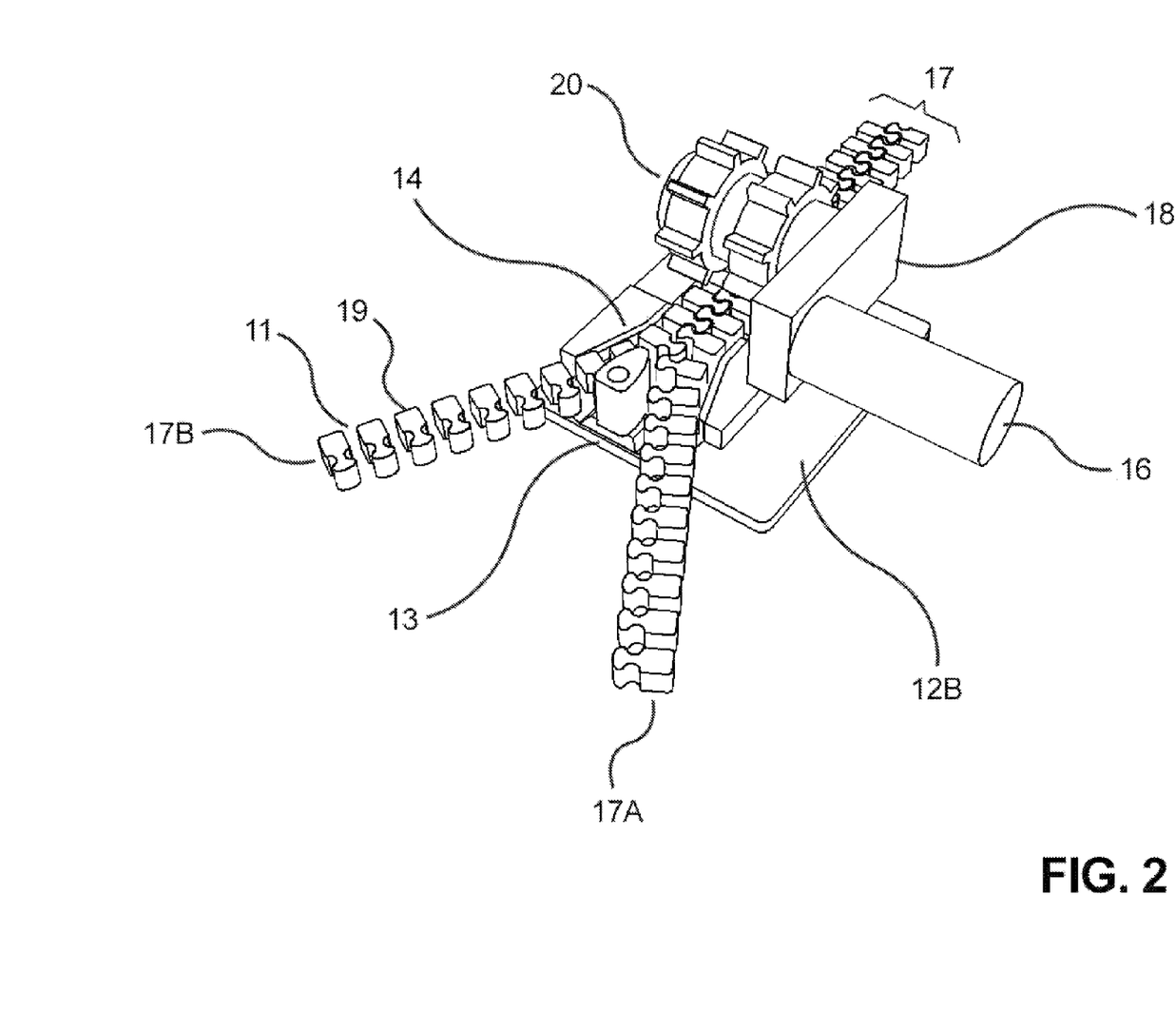
FIG. 2 is a perspective view with the upper chassis removed to reveal the internal split gear and zipper teeth coupling.

In FIG. 2 one can see the split spur gear 20 consists of two sets of teeth that are out of phase but physically connected with each other and therefore moving in unison. In another embodiment this could be represented with two separate gears not physically connected but still moving in unison but with the gear teeth still positioned out of phase. When one looks at the joined zipper teeth 19 one can observe the alternating gaps 11 on either side of the zipper halves. The out of phase teeth mesh with the alternating gaps 11 between the zipper teeth 19 and is therefore in mechanical coupling with the zipper teeth 19. This configuration allows the torque/force generated by the motor 16 to transmit through the gearbox 18, into the split spur gear 20 and then finally to the zipper teeth 19, thus advancing or retracting the robot zipper 10 in a linear motion along the zipper tape while simultaneously joining or separating the two edges with zipper teeth. The actuation is similar in nature to a rack and pinion gear assembly with the zipper tape 17 acting as the rack component and the split gear 20 acting as the pinion. In another practice of the invention the split gear could take on the form of a rubber roller with no gear teeth but instead rely on friction coupling between the roller's rubber gripping surface and the surface of the joined zipper teeth. Still further, in certain embodiments both the split gear coupling and friction coupling could be used together.

Figure 3:
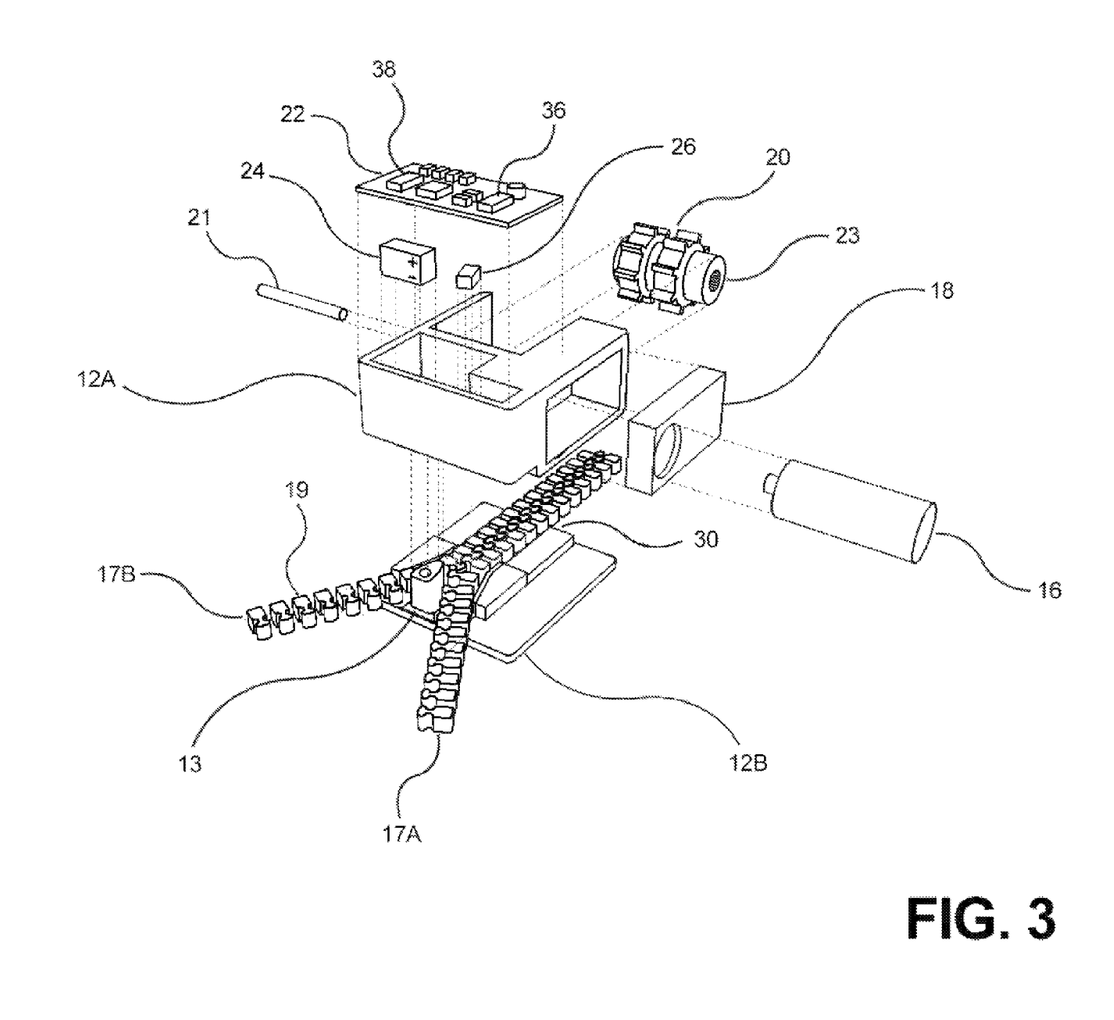
FIG. 3 is an exploded view of the robotic zipper system revealing several components that are either inside the chassis or which otherwise would be hidden.
Figure 4:
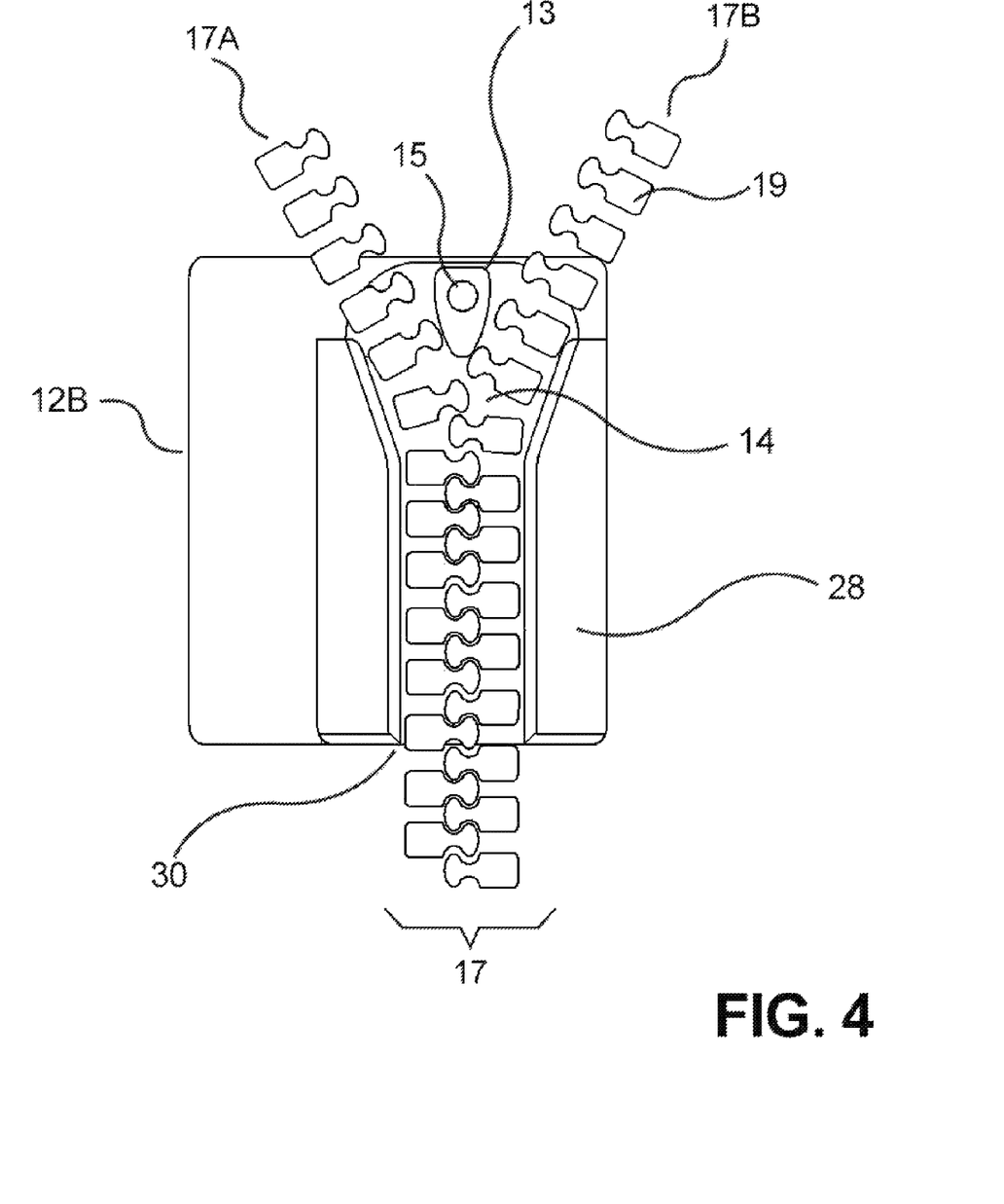
FIG. 4 is a top plan view of the robotic zipper illustrating an opening in the upper chassis for a sensor to monitor the zipper teeth as they pass through the channel below.
Figure 5:
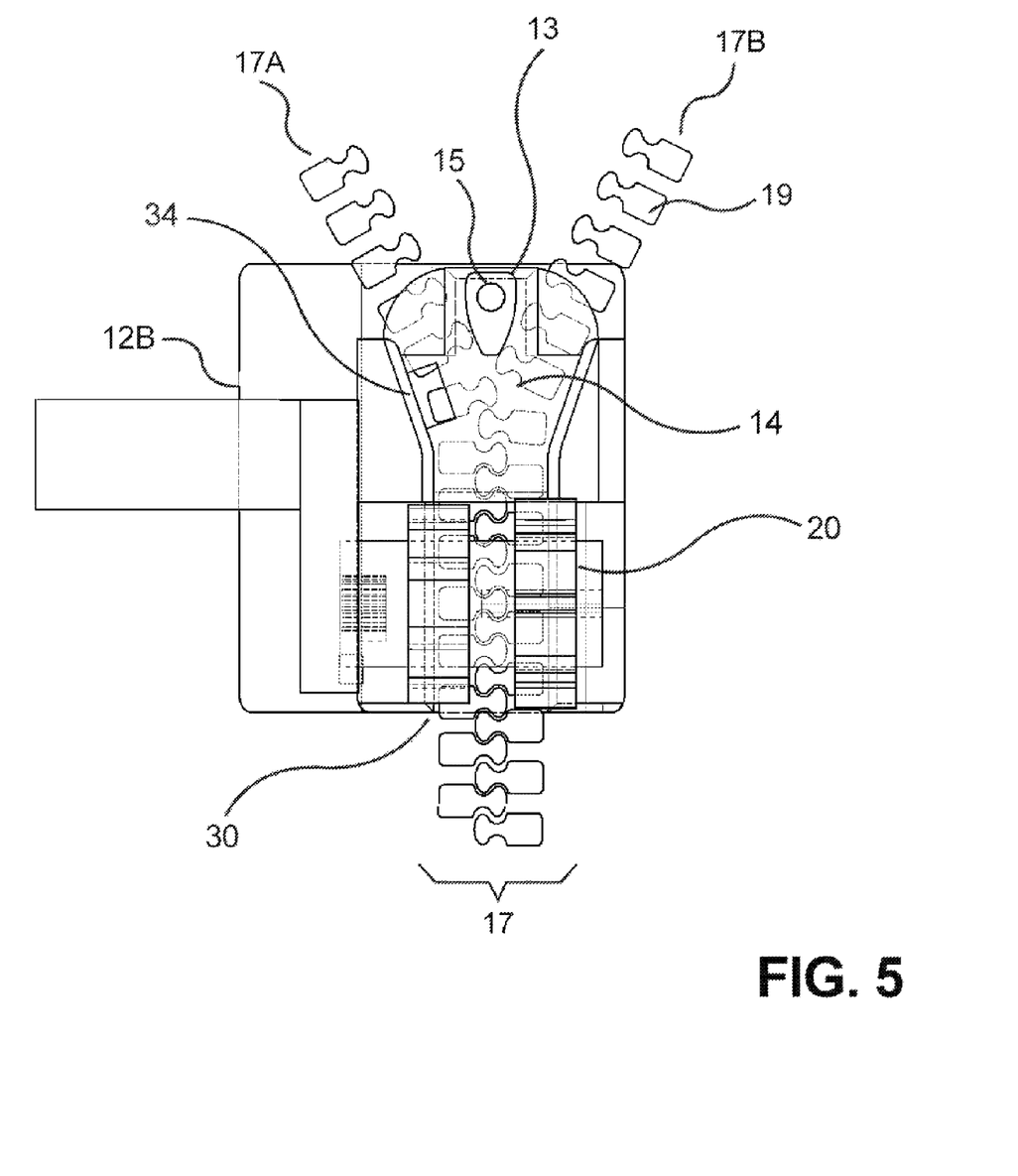
FIG. 5 is a top plan view of the lower chassis illustrating the channel that the zipper teeth an opening in the chassis for a sensor to monitor the zipper teeth as the pass through the chassis.

The zipper teeth 19 are shaped in a manner which allows them to interlock with each other and are attached in a manner to the zipper tape 17 which is generally a fabric or textile material. The zipper tape 17 is essentially two halves, a left half 17A and a right half 17B, that are joined to form the closure. As shown in FIGS. 3, 4 and 5 the zipper slider 14 has an internal Y-shaped channel zipper slide geometry which merges the two halves of the zipper tape into one. As shown in FIG. 4, the zipper slider 14 has an internal zipper slide geometry that generally has two channels entering at an approximate 45 degree angle to each other forming a V-shape which the merge into one single channel, thus forming what could generally be referred to as a Y-shaped channel. This configuration allows for the joining or separating of the two zipper tape 17 halves by having each individual zipper tape 17 half guided through the angled V-shape channels which then join the two halves together when they are forced into the merged single channel of the Y-shape. The chassis bottom half 12B has a triangular wedge shaped post 13 that acts as part of the Y-shaped channel and the zipper slide geometry which joins or separates the zipper. In addition, the post 13 also acts as the mechanical support joining the chassis top half 12A and the chassis bottom half 12B. The post 13 has a hollowed out conduit 15 running through it providing an unobstructed path between the chassis top half 12A and the chassis bottom half 12B which would advantageously allow for electrical wires or other components to pass through.

The chassis 12 should be constructed of a rigid material, such as aluminum, to adequately support the other components although other suitable materials could be used. As shown in FIG. 3 in the preferred embodiment the chassis 12 is divided into a chassis top half 12A and a chassis bottom half 12B which in some instances makes it easier to assemble. The gear box 18 could consist of any arrangement of gears and mechanical components to achieve the desired output torque. The split spur gear 20 is fastened to the gear box 18 on one side via a servo hub 23 and on the other side to the chassis 12 via an axle 21. The axle 21 is a rod which passes through a hole in the chassis 12 and through the center of the split spur gear 20.

Looking to FIG. 4 the robotic zipper system 10 is shown to have a chassis bottom half 12B with a lower plate portion 28 which has a recessed extended channel 30 that assists in guiding the joined zipper into or out of the zipper slider 14. The lower plate portion 28 of the chassis bottom half 12B should be of a rigid enough material, of, for example in this instance, aluminum, to offer support to the zipper teeth 19 as the split gear 20 will generate a certain amount of downward force as the gear teeth interface with the zipper teeth 19.

As seen, for instance, in FIG. 5 the chassis 12 in the chassis top half 12A has an opening 34 in which an optical sensor 26, indicated in FIG. 3, can be located to have a clear unobstructed view of the zipper teeth 19 as they pass through the zipper slider 14. In the preferred embodiment the optical sensor 26 is a reflective type photointerrupter sensor that could detect the reflected light from the surface of the zipper teeth 19 and distinguish the less light reflected from the fabric located in the alternating gaps 11 between the individual zipper teeth. In this manner the system can count the zipper teeth 19 as they pass through the chassis 12 in order to estimate the position of the robot zipper 10 along the zipper tape 17. Yet other embodiments of the invention might have an optical encoder on the shaft of the motor, split gear or other rotating component in the driving system to estimate position. While the optical sensor 26 in the preferred embodiment is being used to estimate position, other sensors could be utilized to examine the zipper teeth and the joining of the zipper teeth. For example an image sensor could inspect the zipper teeth for any faults in the joining or a gas sensor could be used to detect particular gases escaping from a sealed zipper.

Figure 1:
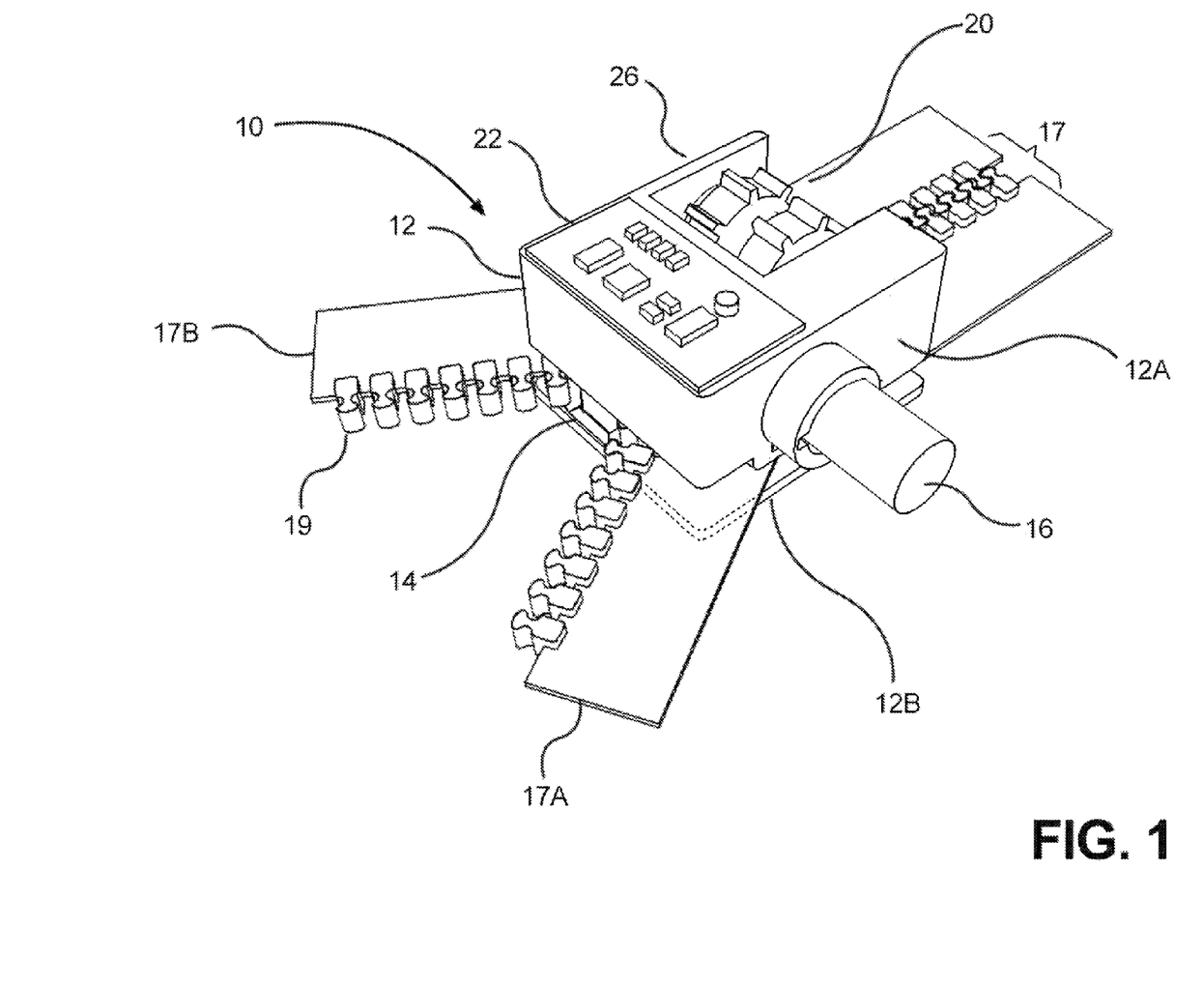
FIG. 1 is a perspective view of the robotic zipper system according to the invention.

As seen in FIG. 1 and FIG. 3 the preferred embodiment of the robot zipper 10 also comprises electronic circuitry 22, optical sensor 26 and a rechargeable battery 24 for powering both the motor 16 and the electronic circuitry 22 while electrical wires are not depicted in the figures for simplicity, these components would be in electrical connection with each other. The electronic circuitry 22 include a variety of electronic components for numerous computational needs and applications comprising a main control module, a communication module, and a sensor module. However in this preferred embodiment of the robotic zipper system 10, the main control module will process the input and output of the combination of the optical sensor 26 and motor 16 to create a servomechanism in order to provide controlled operation of mechanical position, speed or other parameters through the use of feedback. Since the zipper teeth themselves represented a binary pattern i.e. zipper tooth-no zipper tooth-zipper tooth, optically detecting this patter can be utilized to count zipper teeth and therefore gauge position and speed of the robot zipper. In this embodiment, infrared subminiature reflective type photointerrupters were mounted within the zipper slide in order to detect the edges of the passing zipper teeth, as the surface of the zipper teeth reflects more light than the fabric of the zipper tape 17. This can be achieved in a variety of ways for example a microprocessor receiving signals from the optical sensor 26 which then can send a signal to an H-Bridge motor controller circuit which could control the direction of the motor 16. The electronic circuitry 22 could of course perform other functions such as the operation of lights 36 to provide visual indication or visual feedback to people or provide the ability for the robot zipper to utilize input based on a touch sensor 38. As seen in FIG. 3 the touch sensor 38 is located on the electronic circuit board but could be mounted anywhere on the chassis. In one preferred embodiment, the robot zipper would in totality be a fully programmable system, comprising a main control module, a communication module, and a sensor module. Although one could envision these modules being physically distributed as well but still constituting a complete robotic system.

With certain details and embodiments of the present invention for a robotic zipper system disclosed, it will be appreciated by one skilled in the art that numerous changes and additions could be made thereto without deviating from the spirit or scope of the invention. This is particularly true when one bears in mind that the presently preferred embodiments merely exemplify the broader invention revealed herein. Accordingly, it will be clear that those with major features of the invention in mind could craft embodiments that incorporate those major features while not incorporating all of the features included in the preferred embodiments.

Therefore, the following claims shall define the scope of protection to be afforded to the inventor. Those claims shall be deemed to include equivalent constructions insofar as they do not depart from the spirit and scope of the invention. It must be further noted that a plurality of the following claims may express certain elements as means for performing a specific function, at times without the recital of structure or material. As the law demands, any such claims shall be construed to cover not only the corresponding structure and material expressly described in this specification but also all equivalents thereof.

I claim as deserving the protection of Letters Patent:

1. A robotic zipper system for joining and separating zipper halves of a zipper tape with a zipper slide geometry, the robotic zipper system comprising:
 a chassis;
 an actuator retained by the chassis wherein the actuator drives the zipper slide geometry along the zipper tape thereby to join or separate the zipper tape; and
 a sensor for determining a position of the zipper slide geometry along the zipper tape.

2. The robotic zipper system of claim 1 wherein the sensor achieves position detection by detecting the presence or absence of zipper teeth.

3. A robotic zipper system for joining and separating zipper halves of a zipper tape with a zipper slide geometry, the robotic zipper system comprising:
 a chassis; and
 an actuator retained by the chassis wherein the actuator drives the zipper slide geometry along the zipper tape thereby to join or separate the zipper tape wherein the actuator comprises a motor and further comprising a control module to provide an electrical signal to the motor to move in a forward direction to join the zipper halves of the zipper tape or a reverse direction to separate the zipper halves of the zipper tape.

4. The robotic zipper system of claim 3 further comprising a motor control module retained by the chassis wherein the actuator comprises a motor and an electronic circuit for the motor control module.

5. The robotic zipper system of claim 4 wherein the electronic circuit has a communication module for sending and receiving electronic signals and data.

6. A robotic zipper system for joining and separating zipper halves of a zipper tape with a zipper slide geometry, the robotic zipper system comprising:
 a chassis;
 an actuator retained by the chassis wherein the actuator drives the zipper slide geometry along the zipper tape thereby to join or separate the zipper tape; and
 electronic circuitry operative as a communication module for exchanging data.

7. The robotic zipper system of claim 6 further comprising visual indicators located on the chassis.

8. The robotic zipper system of claim 6 further comprising a sonic indicator.

9. The robotic zipper system of claim 6 further comprising a touch sensor.

10. A robotic zipper system for joining and separating zipper halves of a zipper tape with a zipper slide geometry, the robotic zipper system comprising:
 a chassis; and
 an actuator retained by the chassis wherein the actuator drives the zipper slide geometry along the zipper tape thereby to join or separate the zipper tape;
 wherein the zipper halves have zipper teeth, wherein the actuator comprises a motor and a gear system, wherein the motor is operative to drive the gear system, and wherein the gear system mechanically engages the zipper teeth.

11. The robotic zipper system of claim 10 wherein the gear system that has two sets of teeth that are out of phase with each other and that mesh with alternating gaps between the zipper teeth.

12. The robotic zipper system of claim 10 wherein the gear system mechanically engages the zipper teeth via friction with a wheel/roller that uses surface friction to engage the zipper tape.

13. A robotic zipper system for joining and separating zipper halves of a zipper tape with a zipper slide geometry, the robotic zipper system comprising:
 a chassis; and
 an actuator retained by the chassis wherein the actuator drives the zipper slide geometry along the zipper tape thereby to join or separate the zipper tape wherein the zipper slider geometry is integrated into the chassis.

14. The robotic zipper system of claim 13 wherein the zipper halves have zipper teeth and wherein the chassis has a bottom plate with a channel forming the zipper slider geometry wherein the channel guides the zipper teeth into and out of the zipper slider geometry for joining or separating the zipper tape.

15. The robotic zipper system of claim 14 wherein the actuator comprises a motor and a gear system, wherein the motor is operative to drive the gear system, wherein the gear system mechanically engages the zipper teeth, and wherein the bottom plate further provides physical support for mechanical engagement of the gear system and the zipper teeth.

16. The robotic zipper system of claim 13 wherein the chassis has a base plate and an opening in the base plate to provide an unobstructed view of the presence or absence of zipper teeth.

17. The robotic zipper system of claim 16 further comprising a sensor positioned to detect the presence or absence of zipper teeth through the opening in the base plate.

18. The robotic zipper system of claim 13 wherein the chassis has a central post.

19. The robotic zipper system of claim 18 wherein the central post has a hollow conduit.

20. A robotic zipper system for joining and separating zipper halves of a zipper tape with a zipper slide geometry, the robotic zipper system comprising:
   a chassis; and
   an actuator retained by the chassis wherein the actuator drives the zipper slide geometry along the zipper tape thereby to join or separate the zipper tape wherein the actuator comprises a motor and a gear system and wherein the motor and gear system selectively switch a back-drivable transmission for manual operation.

21. A robotic zipper system for joining and separating zipper halves of a zipper tape with a zipper slide geometry, the robotic zipper system comprising:
   a chassis; and
   an actuator retained by the chassis wherein the actuator drives the zipper slide geometry along the zipper tape thereby to join or separate the zipper tape wherein the actuator comprises a motor and a power source comprising a battery for supplying electric power to the motor.

22. A robotic zipper system for joining and separating zipper halves of a zipper tape with a zipper slide geometry, the robotic zipper system comprising:
   a chassis; and
   an actuator retained by the chassis wherein the actuator drives the zipper slide geometry along the zipper tape thereby to join or separate the zipper tape wherein the actuator is removable from the zipper tape.

* * * * *